L. D. SUTTON.
SHOCK ABSORBER.
APPLICATION FILED FEB. 4, 1919.
1,341,395.
Patented May 25, 1920.
2 SHEETS—SHEET 1.
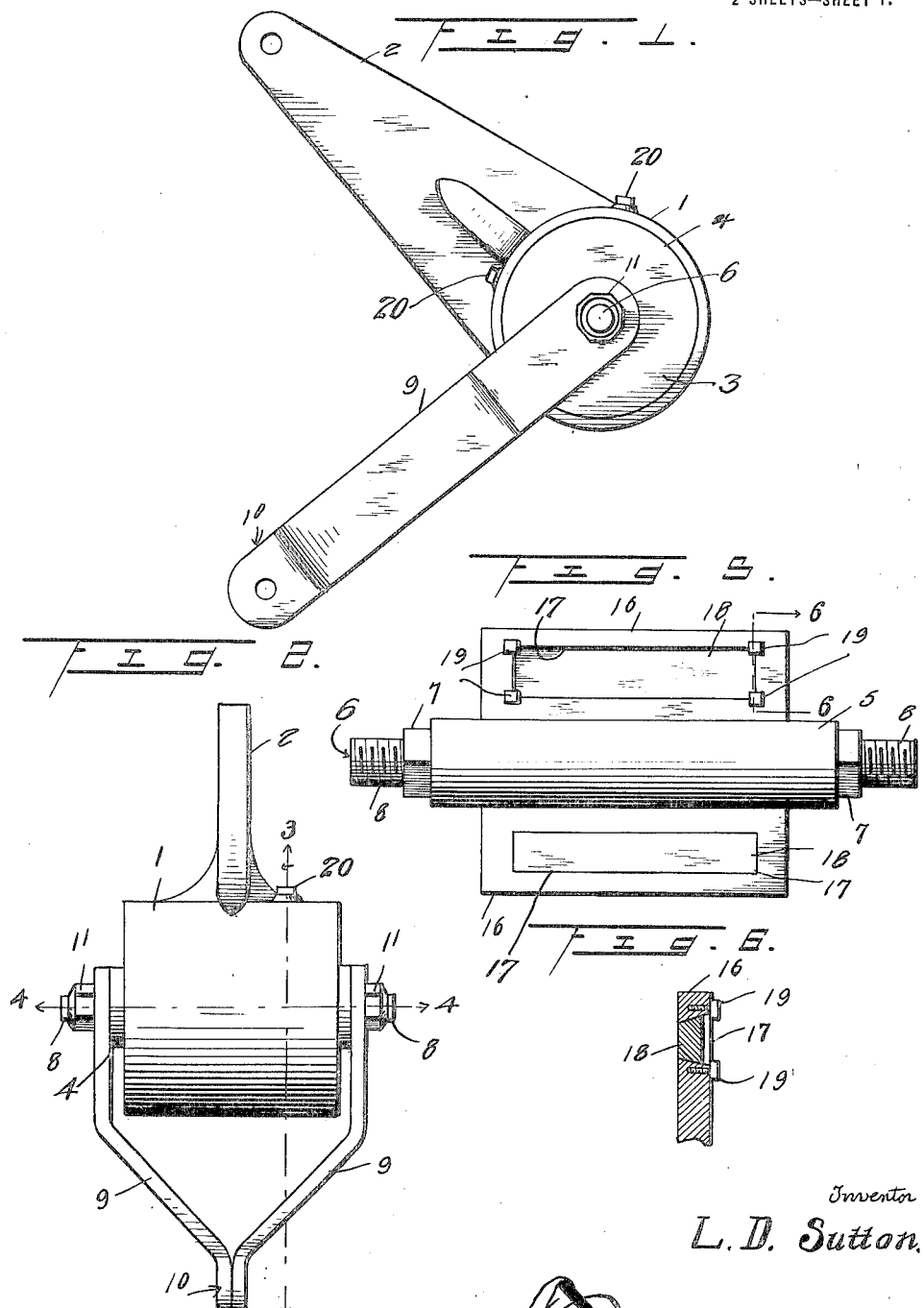

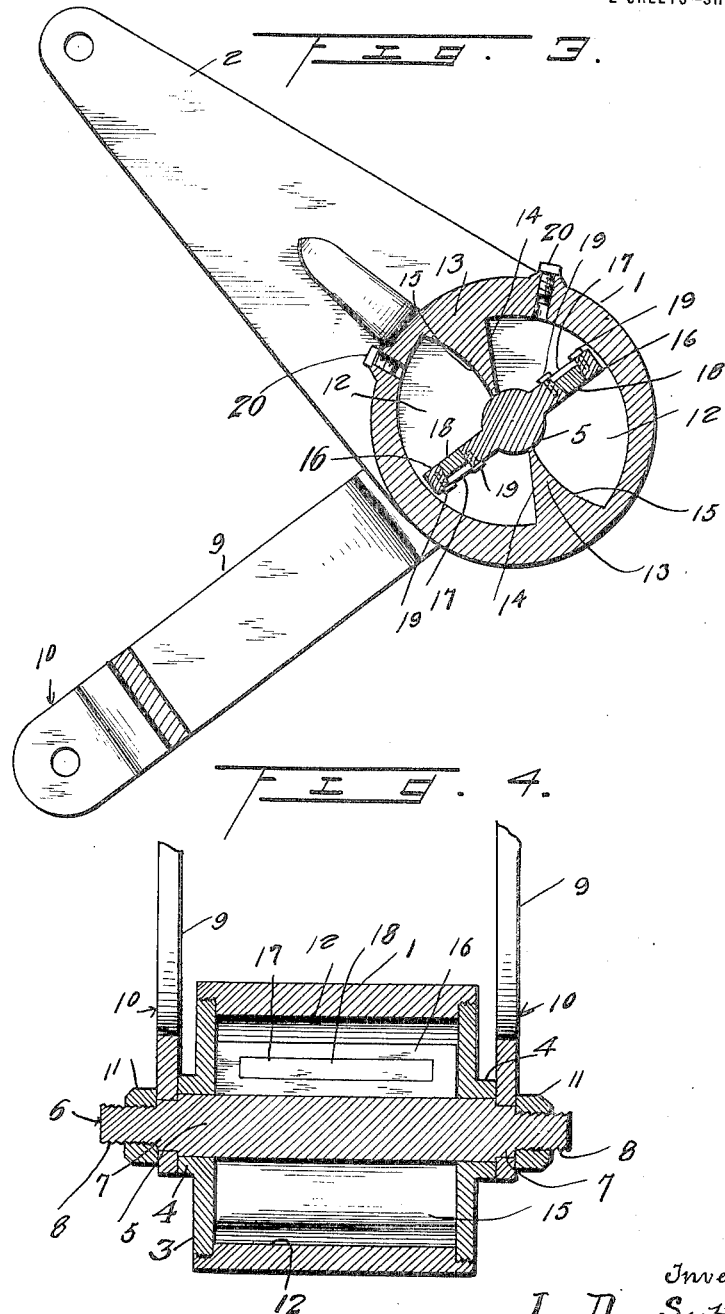

UNITED STATES PATENT OFFICE.

LOUIS D. SUTTON, OF LIBBY, MONTANA.

SHOCK-ABSORBER.

1,341,395. Specification of Letters Patent. Patented May 25, 1920.

Application filed February 4, 1919. Serial No. 274,958.

*To all whom it may concern:*

Be it known that I, LOUIS D. SUTTON, a citizen of the United States, residing at Libby, in the county of Lincoln and State of Montana, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers, and more particularly to a shock absorber specially adapted for use in connection with automobiles and similar vehicles.

One of the main objects of the invention is to provide a shock absorber of simple construction and operation which may be readily applied, and in which all unnecessary elements are eliminated.

A further object is to provide a shock absorber which acts to retard rebound of the vehicle body by forcing a liquid through a constricted escape opening, this opening decreasing uniformly in size as the vehicle body approaches normal position so as to gradually bring the body to a stop thus eliminating all unnecessary jerks or jars.

A further object is to provide a shock absorber of low cost which may be easily produced and readily installed.

A further object is to provide an absorber which will not materially retard downward movement of the vehicle body so as to permit compression of the supporting springs therefor in the usual manner.

Further objects will appear from the detailed description.

In the drawings:

Figure 1 is an end view of a shock absorber constructed in accordance with my invention.

Fig. 2 is a side view.

Fig. 3 is a section taken substantially on line 3—3 of Fig. 2.

Fig. 4 is a section taken on line 4—4 of Fig. 2.

Fig. 5 is a detail of the core of the absorber.

Fig. 6 is a fragmentary detail taken substantially on line 6—6 of Fig. 5.

The body 1 of the absorber is of cylindrical shape and is provided with an integral substantially radially projecting arm 2 which is adapted to be secured at its upper end to the vehicle body by means of a suitable bracket in the well known manner. This body is provided with a cylindrical axial bore in each end, the wall of which is screw threaded to receive an exteriorly screw threaded closure member or plug 3 provided with an outwardly extending bearing neck 4. It will be understood that, if preferred, a suitable end cap or head may be substituted for this plug, this cap being provided with an angular flange which is interiorly threaded and screws over the end portion of body 1. The end plugs 3 receive snugly the end portions of enlarged body 5 of a supporting shaft 6 which extends axially through body 1, this shaft acting to support body 1 and the plugs 3 for rocking movement in either direction about a horizontal axis. Shaft 6 is further provided, adjacent each end of the body portion 5 thereof, with a squared element 7, and with an outer cylindrical threaded element 8. The squared elements 7 fit snugly through corresponding openings in the upper ends of the arms 9 of an attaching yoke 10, the lower end of which is adapted to be secured to the axle of the vehicle through the medium of an attaching bracket in the well known manner. Suitable securing nuts 11 are screwed upon the reduced threaded end portions 8 of the shaft 6 and act to effectually secure body 1 in the yoke 10, this body being supported by the shaft and yoke for rocking movement about a horizontal axis, as above stated.

The body 1 is bored or cut out at its central portion to provide two oppositely directed oil chambers 12 of substantially segmental cross section and extending the full interior length of the body, the ends of these oil chambers being closed by the end plugs 3. As will be noted more clearly from Fig. 3, these oil chambers are oppositely disposed, their outer arched walls being curbed on arcs struck from different centers and eccentric to the axis of the body 1. The oil chambers are spaced apart so as to form two separate compartments separated from each other by the substantially tapered V-shaped inwardly directed web members 13 which extend inwardly to the body portion 5 of shaft 6, the inner ends or apexes of these members being ground to fit snugly about body 5 so as to form a substantially liquid tight closure therewith. Each of the chambers 12 is provided with one straight end wall 14 and one concaved end wall 15, the end walls of the two chambers being oppositely related as illustrated.

Body 5 of shaft 6 is provided with two integral diametrically opposite and radially extended blades 16. These blades are of such length that, when the attaching arm 2 is in its uppermost position, the blades will be positioned closely adjacent the straight walls 14 of oil chambers 12, the outer ends of these blades being in close contact with the outer arcuate walls of the oil chambers so as to form a snug closure therewith to prevent the escape of liquid confined between the blade and the adjacent walls 14 or, more correctly stated, to permit but very slow escape of this liquid, the blades corresponding in length to the end wall 14. In this manner, by placing a suitable liquid, such as oil of proper consistency, in the casing or body 1 so as to fill the oil chambers 12, any sudden rebound of the vehicle body will be prevented by the action of blades 16 upon this liquid. As the outer walls of the oil chambers 12 are curved on arcs eccentric to the axis of shaft 6, when the upper arm 2 is depressed so as to rock casing or body 1 in a counter-clockwise direction as considered from Fig. 3, the distance between the outer ends of arms 16 and the outer walls of the oil chambers 12 will increase uniformly with downward movement of the casing, thus permitting free passage of the oil about the ends of blades 16 so as to prevent any appreciable pressure which would tend to in any way interfere with free downward movement of arm 2. Upon return movement of arm 2, the casing or body 1 will be moved in a clockwise direction so as to move the shorter straight end walls 14 of the oil chambers toward the blades 16, the passages between the outer ends of the blades and the outer walls of the oil chambers decreasing uniformly with upward movement of arm 2 thus restricting the flow of oil about the ends of the blades. This results in a uniformly increasing pressure being exerted which retards movement of body 1 in a clockwise direction and, consequently, gradually reduces the speed of upward movement of arm 2. This uniformly increasing pressure continues until the upward movement of the vehicle body is completely stopped, the vehicle body being gently brought to a stop so as to avoid all sudden jerks or rebound.

To insure that there will be no appreciable resistance offered to downward movement of the arm 2 upon the initial downward movement thereof, I provide each of the blades 16 with an oil escape opening and a valve for controlling the flow of oil therethrough. Each blade is provided with a longitudinally extending tapering valve receiving opening 17, these openings tapering in the direction of the concaved end walls 15 of the respective oil chambers 12. A suitable valve 18 is adapted to fit snugly in each of the openings 17, this valve being of less thickness than the blade and being retained in the opening by stop screws 19 which are threaded into the body of blade 16, the heads of these screws projecting over openings 17 adjacent each corner thereof. When the arm 2 is depressed, valves 18 will be unseated so as to permit free flow of the oil through the openings 17 upon the initial downward movement of arm 2, thus effectually preventing all back pressure such as would tend to interfere with proper movement of this arm. Upon continued downward movement of the arm, the distance between the ends of the blades 16 and the outer walls of the oil chambers is increased uniformly to such an extent as to permit flow of the oil about the ends of the blades in the manner previously described. Upon upward movement of arm 2, the valves 18 are forced tightly in position and held seated by the pressure exerted upon the broader faces thereof by the oil within body 1, the valves thus acting to effectually prevent passage of oil through the openings 17 and the blades acting to gradually and gently stop upward movement of arm 2. To permit filling of the oil chambers 12, or replenishing of the supply of oil therein, the body 1 is provided with two filling openings communicating with the respective oil chambers, these openings being normally closed by screw plugs 20.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a shock absorber, a casing adapted to be attached to a vehicle body and provided with two oppositely directed oil chambers positioned at opposite sides of the axis of said casing, each of said chambers being of substantial segmental form in cross section and having its outer wall curved on an arc eccentric to the axis of the casing and so disposed as to produce a relatively short wall at one end of the chamber and a relatively long wall at the other end of the chamber, said shaft extending through said casing centrally thereof so as to rockably support the casing, said shaft being provided with two diametrically opposite radially extending blades operable in the oil chambers and corresponding in length substantially to the shorter end wall of the respective oil chambers whereby uniformly decreasing resistance is presented to flow of oil about the outer ends of these blades when the casing is rocked in one direction and uniformly increasing resistance is presented to flow of the oil when the chamber is rocked in the other direction.

2. In a shock absorber, a casing, an attaching arm carried thereby for attaching the casing to a vehicle body, a supporting shaft extending through said casing, a yoke receiving the end portions of said shaft and adapted to be secured to a vehicle axle, the shaft being secured against rotary movement independently of the yoke, said casing being provided with oil chambers positioned at opposite sides of the shaft and having their outer walls curved on arcs eccentric to the axis of said shaft, the oil chambers being oppositely directed, and blades carried by said shaft and projecting radially therefrom, said blades being positioned diametrically opposite on the shaft and operable in the oil chambers.

3. In a shock absorber, a casing, an arm carried thereby adapted to be attached to a vehicle body, a supporting shaft extending through said casing axially thereof, the casing being provided with oil chambers positioned at opposite sides of the shaft of substantial segmental cross section and having their outer walls curved on arcs eccentric to the axis of the shaft, said oil chambers being oppositely directed, a yoke adapted to be secured to a vehicle axle and receiving the end portions of the shaft so as to support the casing for rocking movement about a horizontal axis, said shaft being secured against rotary movement independently of the yoke, diametrically opposite radially extending blades carried by said shaft and operable in the oil chambers, said blades corresponding in length approximately to the distance between the periphery of the shaft and the nearest point of the outer walls of the oil chambers, the blades being provided with oil escape openings, and valves carried by said blades for closing said openings, said valves being so mounted as to permit passage of oil through the openings of the blades when said attaching arm is depressed while acting to close the openings so as to prevent passage of oil therethrough when the attaching arm is raised.

In testimony whereof I affix my signature in presence of two witnesses.

LOUIS D. SUTTON.

Witnesses:
 D. P. BOYLE,
 CHAS. MCCRORY.